US006259994B1

United States Patent
Henneken et al.

(10) Patent No.: US 6,259,994 B1
(45) Date of Patent: Jul. 10, 2001

(54) PROCESS TO EVALUATE CORNERING FOR AN AUTOMATIC GEARBOX

(75) Inventors: Markus Henneken, Kressbronn; Wolfgang Schmid, Langenargen; Marko Poljansek, Reutlingen, all of (DE); Gary O'Connor, Reddich (GB)

(73) Assignees: Robert Bosch GmbH, Stuttgart; ZF Friedrichshafen AG, Friedrichshafen, both of (DE)

( * ) Notice: Subject to any disclaimer, the term of this patent is extended or adjusted under 35 U.S.C. 154(b) by 0 days.

(21) Appl. No.: 09/180,313

(22) PCT Filed: May 7, 1997

(86) PCT No.: PCT/EP97/02318

§ 371 Date: Nov. 5, 1998

§ 102(e) Date: Nov. 5, 1998

(87) PCT Pub. No.: WO97/43568

PCT Pub. Date: Nov. 20, 1997

(30) Foreign Application Priority Data

May 10, 1996 (DE) .............................................. 196 18 805

(51) Int. Cl.[7] .............................. G01B 3/00; B60K 41/00
(52) U.S. Cl. .............................. 702/33; 702/34; 702/145; 701/37; 701/48; 477/34; 477/46
(58) Field of Search .................... 702/33, 34, 141, 702/142–145; 701/37, 41, 48, 57, 65; 477/43–46, 73, 75, 110, 34, 37

(56) References Cited

U.S. PATENT DOCUMENTS

| 4,679,145 | 7/1987 | Beeck et al. ..................... 364/424 |
| 5,025,684 | 6/1991 | Stehle et al. ..................... 74/862 |
| 5,099,720 | * 3/1992 | Raue ..................... 477/144 |
| 5,157,609 | 10/1992 | Stehle et al. ..................... 364/424.1 |
| 5,235,876 | 8/1993 | Minowa et al. ..................... 74/866 |
| 5,265,019 | * 11/1993 | Harara et al. ..................... 701/41 |
| 5,513,108 | * 4/1996 | Kishimoto et al. ..................... 701/48 |
| 5,947,862 | * 9/1999 | Knapp et al. ..................... 477/46 |

FOREIGN PATENT DOCUMENTS

| 33 41 652 A1 | 6/1985 | (DE) . |
| 39 22 051 C2 | 1/1991 | (DE) . |
| 41 20 603 C2 | 1/1993 | (DE) . |
| 43 12 717 A1 | 11/1993 | (DE) . |
| 0 471 102 A1 | 2/1992 | (EP) . |
| 0 638 742 A1 | 2/1995 | (EP) . |
| 95/20114 | 7/1995 | (WO) . |

OTHER PUBLICATIONS

*ATZ Automobiltechnische Zeitschrift* 95 (1993) Die Adaptive Getriebesteuerung für BMW–Automobile by Andreas Welter, Friedrich Renoth and Emanuel Fuchs, pp. 420–434 (No translation).

*ATZ Automobiltechnische Zeitschrift* 97 (1995) "Die elektronische Steuerung des automatischen Getriebes W5A 330/580 von Mercedes–Benz" by Rudolf Rösch and Gerhard Wagner, pp. 736–748, (No translation).

\* cited by examiner

*Primary Examiner*—Patrick Assouad
*Assistant Examiner*—Bryan Bui
(74) *Attorney, Agent, or Firm*—Davis and Bujold, P.L.L.C.

(57) ABSTRACT

A process for evaluation of cornering of a vehicle equipped with an automatic transmission by use of electronic transmission control device having a calculation unit, a microcontroller, a memory device and a control device for start up of a hydraulic transmission control device. During a first processing operation (S1), a transverse acceleration (a_Quer) of the vehicle is determined by the calculation unit (30) from wheel speed (n_Rad) of the vehicle measured by a measuring device (34). During a second processing operation (S2), a driver-type theoretical value (FT_Soll) is determined from a vehicle transverse acceleration (a_Quer) and a vehicle speed (v_F). A gear change characteristic line (SL) is determined, based upon an increment (INKR) between the driver-type theoretical value (FT_Soll) and a driver-type actual value (FT_Ist), from several gear change characteristic lines each one associated with a certain driver type or cornering style.

12 Claims, 4 Drawing Sheets

PROCESS TO EVALUATE CORNERING FOR AN AUTOMATIC GEARBOX

The invention relates to a process for evaluating cornering in the automatic transmission of a vehicle by means of an electronic transmission control device having a calculation unit, a micro-controller, a memory device and a control device for starting up a hydraulic transmission control device. "Intelligent" gear change programs are known in the art for electro-hydraulically controlled automatic transmissions of passenger cars.

BACKGROUND OF THE INVENTION

One example of an intelligent gear change program has been described in DE-OS 39 22 051 wherein by "intelligent" it is understood that the driver of a vehicle needs not actuate any selector button for setting a certain gear change range, i.e., sporting drive or economic drive, since an electronic control device infers on the basis of input variables the behavior of the driver and thus the type of driver. For example, here the signal of a throttle valve, the speed of an internal combustion engine and both the longitudinal and transverse acceleration, as determined from the wheel speeds, serve as input variables. According to the prior art, a driving activity or a driver type is determined from the input variables. Based on the driver type an adequate gear change characteristic line is then selected from a plurality of gear change characteristic lines. Thus, for a slow drivertype, for example, a gear change characteristic line with low gear change points is selected, and for a sporting driver type, a gear change characteristic line with high gear change points is selected.

Since the behavior of a driver in different driving situations can be different, an otherwise sporting driver, for example, who in curves prefers a slower drive, would find inappropriate in the above mentioned driving situation to have his driving behavior in general classified as sporting. The gear change program must therefore be able to flexibly react to different driving situations.

German patent 41 20 603 has disclosed a process relative to cornering in which an upshift is admissible only when the transverse acceleration is below a limit value.

This process known from the prior art thus has the disadvantage that when cornering with a high transverse acceleration even though a gear change is eliminated, the driving activity or the type of driver is not evaluated.

SUMMARY OF THE INVENTION

The problem solved by this invention is to provide a process by which a driver type is evaluated even when cornering.

According to the invention there is provided a process for evaluation of cornering in an automatic transmission of a vehicle by means of an electronic transmission control device having a calculation unit, a micro-controller, a memory device and a control device for start-up of a hydraulic transmission control device, characterized by the following steps: 1) from wheel speeds (n_Rad) measured by a measuring device (34) on wheels of the vehicle, a transverse acceleration (a_Quer) of the vehicle is determined in first processing operation (S1) by the calculation unit (30); 2) in one other processing operation (S2) a driver-type theoretical value (FT_Soll) is determined from the vehicle transverse acceleration (a_Quer) and a vehicle speed (V_F); and 3) from an increment (INKR) between the driver-type theoretical value (FT_Soll) and a driver-type actual value (FT_Ist) a gear change characteristic line (SL) is determined from several gear change characteristic lines each one associated with a certain driver type or cornering style.

The process according to the invention has the added advantage that the actual driver-type value used in the process is always kept on the actually last state.

BRIEF DESCRIPTION OF THE DRAWINGS

Other advantages of the invention result from the subclaims and the description of the invention that follows having reference to the basic drawing in which:

DESCRIPTION OF THE PREFERRED EMBODIMENTS

Figure 1:
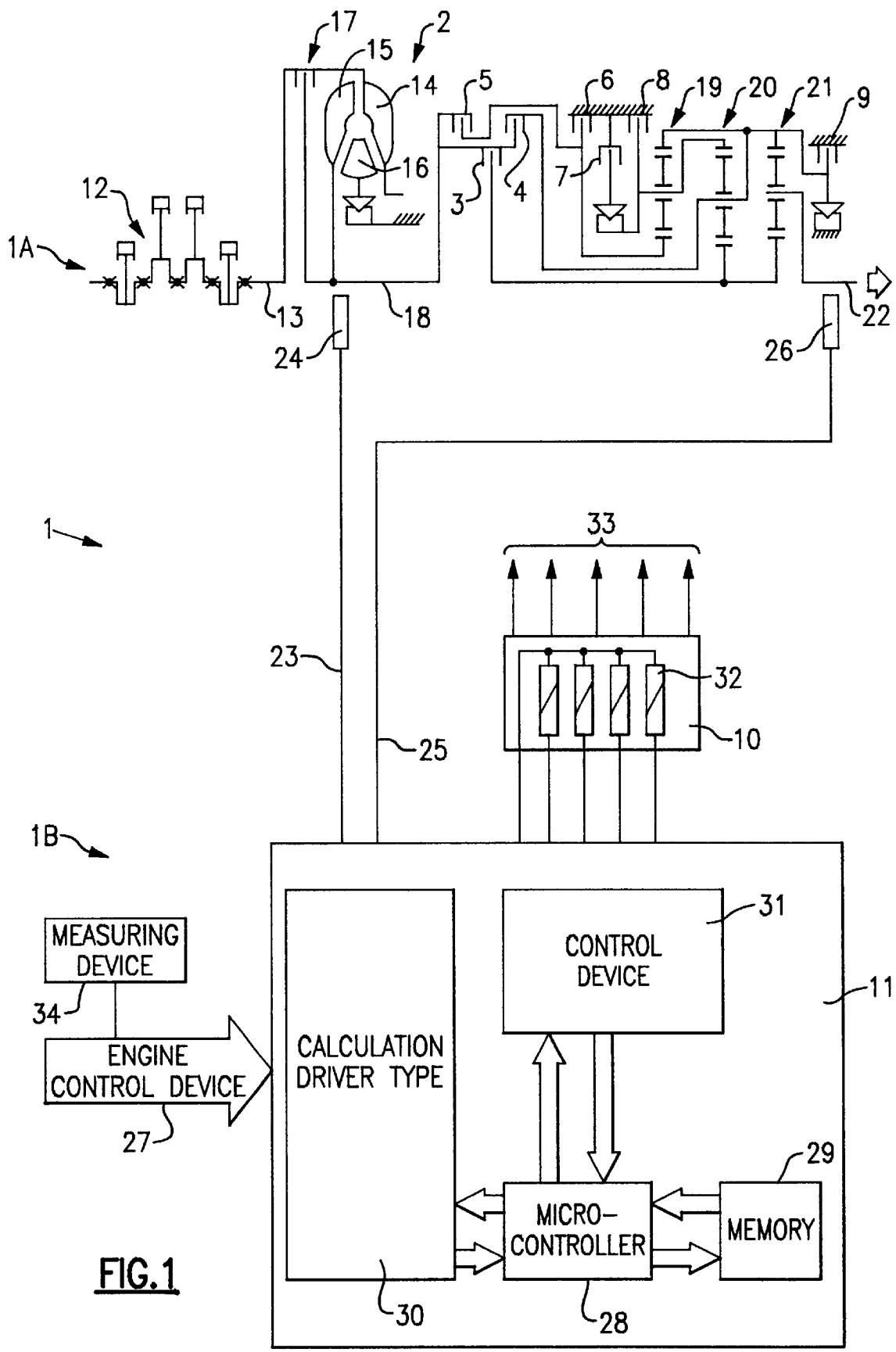
FIG. 1 is an extensively schematized system diagram of an automatic transmission.

FIG. 1, is an extensively schematized system diagram of an automatic transmission 1. The automatic transmission 1 consists of a mechanical part 1A having a hydrodynamic converter 2 and gear change components 3 to 9 consisting of clutches and brakes and a control part 1B having a hydraulic control device 10 and an electronic control device 11. The automatic transmission 1 is driven by an input unit 12, conveniently an internal combustion engine, via an input shaft 13. The input shaft 13 is non-rotatably connected with an impeller 14 of the hydrodynamic converter 2 which in addition has a turbine wheel 15 and a stator 16. Parallel to the hydrodynamic converter 2 is situated a converter clutch 17. The converter clutch 17 and the turbine wheel 15 lead to turbine shaft 18, said turbine shaft 18 having, when the converter clutch is actuated, the same speed as the input shaft 13. The mechanical part 1A of the automatic transmission 1 has together with the hydrodynamic converter 2 and the clutches and brakes 3 to 9, two free wheels not designated in particular, and three planetary gear sets 19, 20 21 disposed in succession. In the automatic transmission 1, a transmission output shaft 22 leads to a differential, not shown, which drives, via two axle half shafts, also not shown, drive wheels of a vehicle. A gear step is selected via an appropriate clutch/brake combination. Since the components of the automatic transmission 1 are of no further significance for a better understanding of the invention, they will not be discussed in detail at this point.

From the mechanical part IA of the automatic transmission 1 to the electronic control device 11 is a line 23 for transmitting a turbine speed signal produced by a measuring device 24 from the turbine shaft 18 and a line 25 for transmitting a transmission output speed signal produced by a measuring device 26 from the transmission output shaft 22. Together with the transmission output speed signal and the turbine speed signal, an engine control device 27 that controls the internal combustion engine 12 is symbolically indicated in FIG. 1 and transmits to the electronic control device 11 other input variables such as the signal of a throttle valve, the signal of a torque M_M generated by the internal combustion engine 12, the speed n_M of the internal combustion engine 12, temperature of the engine and of the hydraulic fluid of the automatic transmission 1, wheel speeds n-Rad. In accordance with said input variables the electronic control device 11 selects an appropriate gear step via the hydraulic control device 10.

The electronic control device 11, shown extensively schematized in FIG. 1, has for this purpose a micro-controller 28, a memory device 29, a calculation unit 30 to determine the driver type and a control device 31. The data relevant to the transmission to which belong, for example, programs and data, such as diagnosis data, are deposited here in the memory device 29 which is conveniently an EProm, EEProm, or as buffered RAM. The control device 31 serves automatically to control valves 32 which are in the hydraulic control device 10 and are provided for operating the clutches and brakes 3 to 9, as symbolically indicated with the arrow 33 in FIG. 1.

Figure 2:
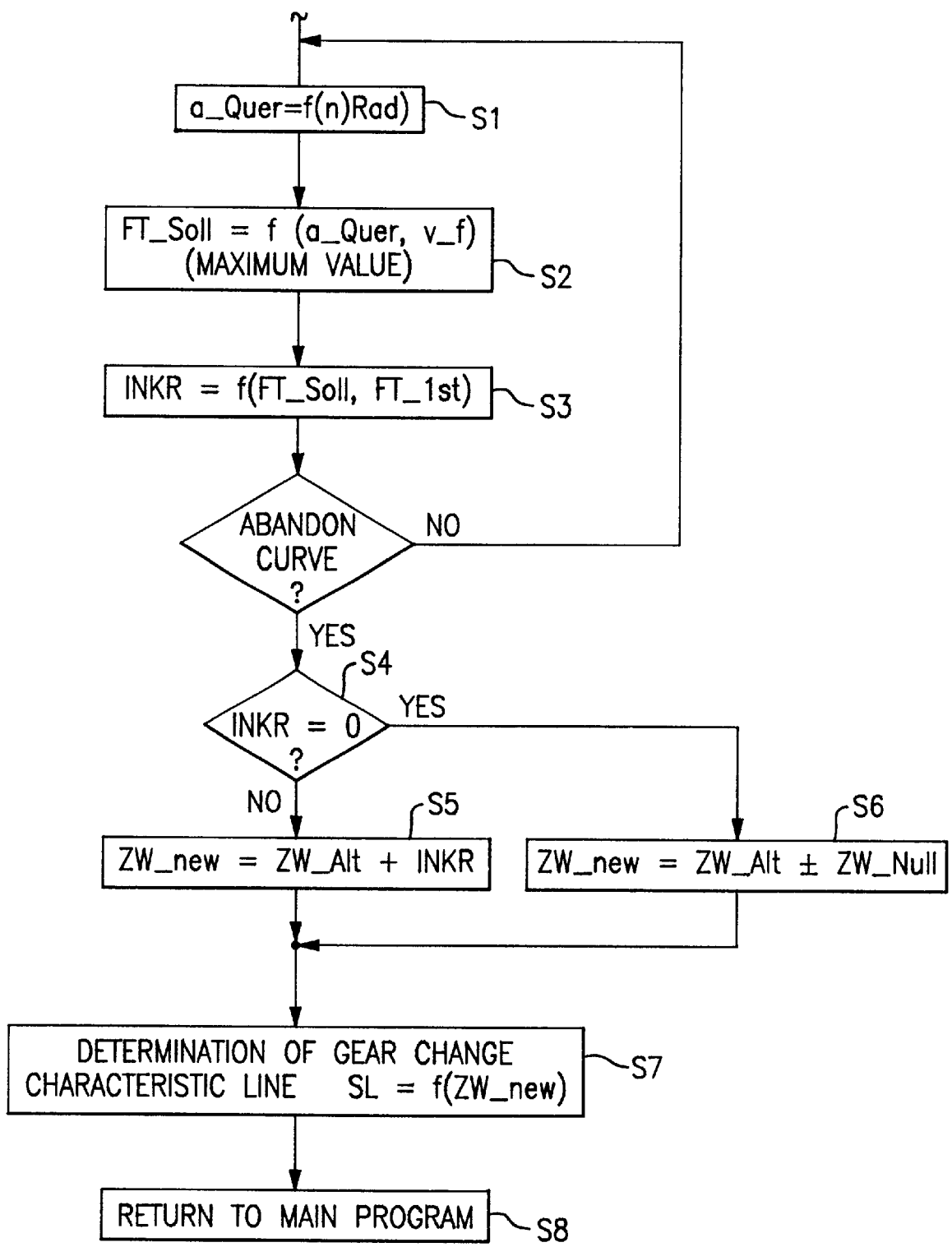
FIG. 2 is a program sequence plan for evaluating cornering.

FIG. 2 shows a program sequence plan for a sub-program to evaluate al cornering. To begin, a wheel speed n_Rad determined by a measuring device 34 is issued to a first processing operation Si of the calculation unit 30 for determining a driver type. The processing operation S1 delivers by a calculation from the wheel speeds n_Rad a transverse acceleration a_Quer of the vehicle. The transverse acceleration a_Quer thus determined is passed on by the processing operation S1 to a processing operation S2 in which, from the vehicle transverse acceleration a_Quer and a vehicle speed v_F, a driver-type theoretical value FT_Soil is determined. The vehicle speed v_F is here determined by the calculation unit 30 from a transmission output speed n_AB measured on the input shaft 22 of the automatic transmission 1. In a subsequent processing operation S3 an increment INKR is determined by a comparison of the driver-type theoretical value FT_Soll with a driver-type actual value FT_Ist.

Figure 3:
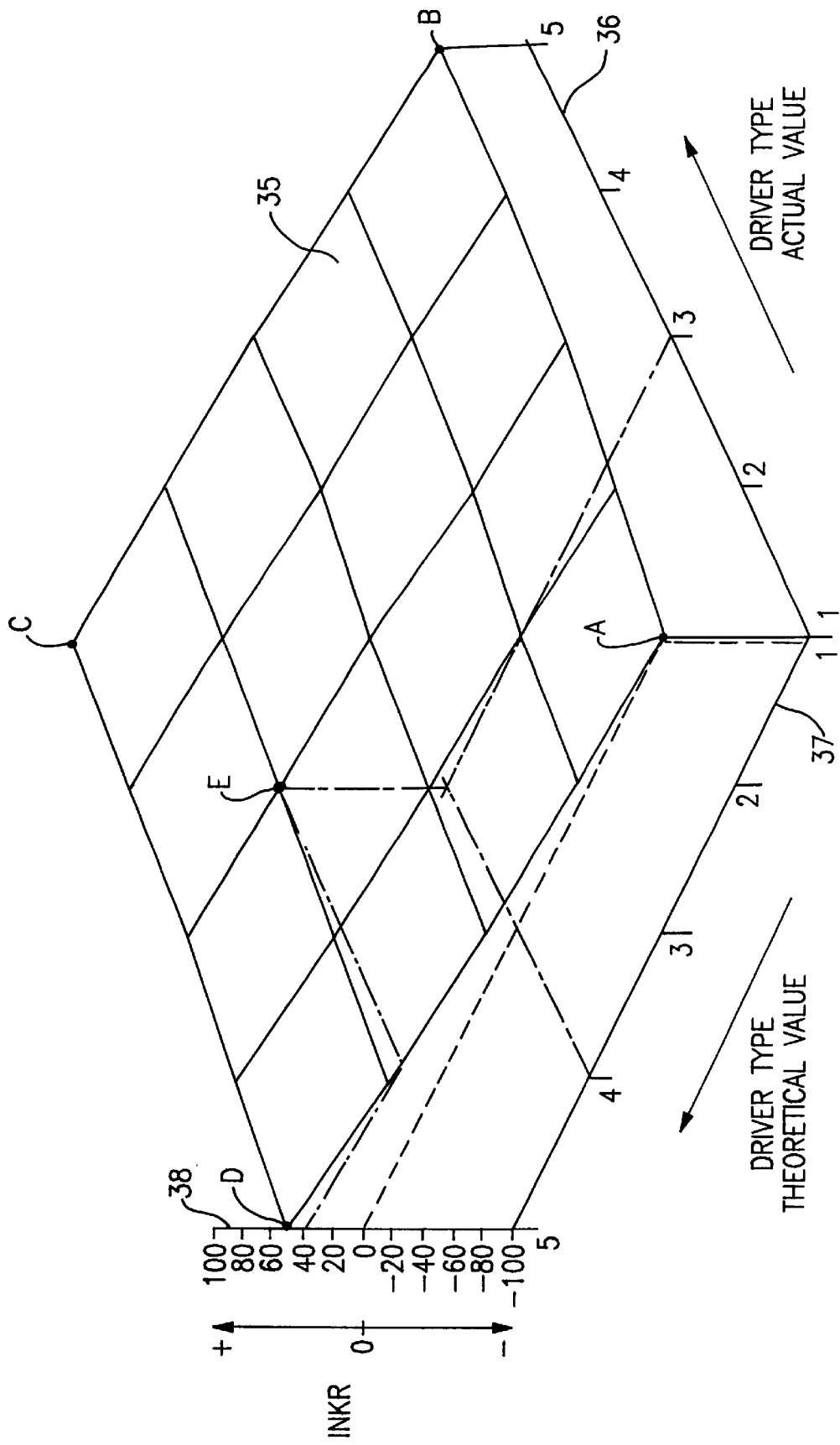
FIG. 3 is a performance graph for determining an increment (INKR)

FIG. 3 shows a preset performance graph 35 which determines the relationship between the driver-type theoretical value FT_Soil, the driver-type actual value FT_Ist and the increment INKR, and serves to determine the increment INKR in the processing operation S3. Here the driver-type actual value FT_Ist is plotted on a first axis 36, the driver-type theoretical value FT_Soll on a second axis 37 and the increment INKR on a third axis 38. In the performance graph 35 is a surface with the terminal points A, B, C and D.

To determine the increment INKR, the driver-type theoretical value FT_Soil and the driver-type actual value FT_Ist are first determined. From the intersection point of said two values in the performance graph 35 the appertaining increment INKR results on the axis 38.

In FIG. 3 can be seen two examples for determining an increment wherein the first example is shown in hatched lines and the second example in dash and dot lines.

In the first example the driver-type theoretical value FT_Soll is determined with the value one and the driver-type actual value FT_Ist with the value one also. As intersection point results the joint A with which is associated the increment value zero.

In the second example is plotted a driver-type theoretical value FT_Soll of four and a driver-type actual value FT_Ist of three. Therefrom results in the performance graph 35 an intersection point E with which is associated on the axis 38 the increment value 40.

In a differentiation operation S4, which can be seen in FIG. 2, is now tested whether the increment is equal to the zero value.

Figure 4:
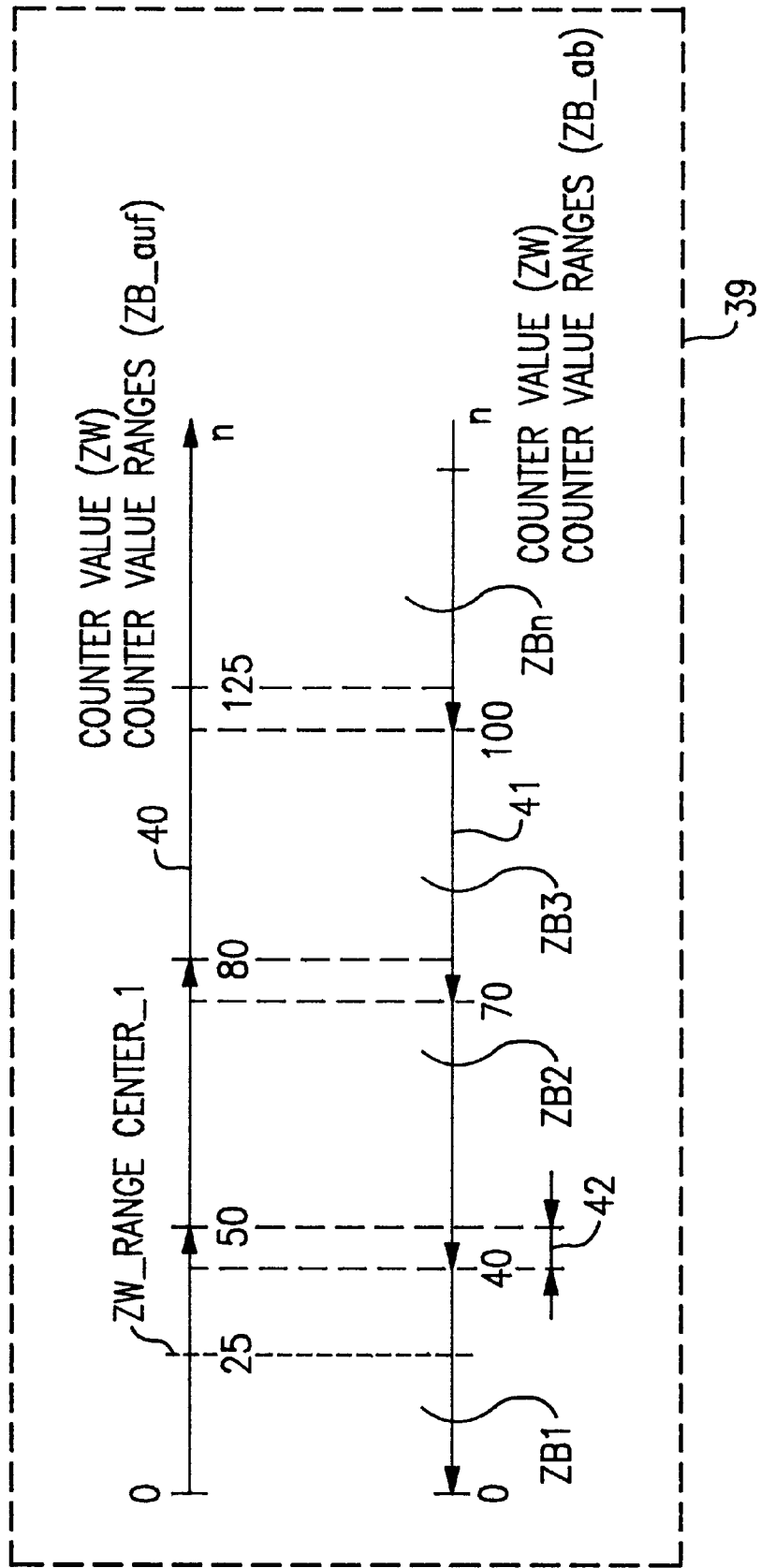
FIG. 4 is a diagrammatic representation of a counter.

According to the result given by the differentiation operation S4, a counter 39 shown in FIG. 4 is set with the counter values ZW which are subdivided in defined counter value ranges ZB associated with a certain driver type or cornering style. The counter 39 has a high counter 40 and a low counter 41 symbolically shown as numeric unlimited lines extending parallel to each other. The high counter 40 begins with the value zero and continuously rises up to a counter value ZW of n and the low counter 41 extending in opposite direction begins with the counter value of n and continuously descend down to the counter value zero. The intervals between the counter values ZW are identical in the high counter 40 and the low counter 41 so that the counter values of the high counter 40 and of the low counter 41 overlap. The counter values are distributed in n-counter value ranges wherein the intervals of a counter value range ZB_auf in the high counter 40 and those of a counter value range ZB_ab in the low counter 41 coincide. But the counter value intervals ZB_auf and ZB_ab are offset relative each other by a certain number of counter values ZW, ten counter values in the example of FIG. 4. According to FIG. 4, the first counter value range Z_Bauf_1 of the high counter 40 begins with the counter count zero and ends at the counter value 50. The second counter value range ZB_auf_2 of the high counter 40 begins at the counter value 50 and ends at the counter value 80. On the other hand, in the instant example, the counter value range ZB_ab_1 of the low counter 41 begins with the counter value 40 and ends at the counter count zero. The second counter value range ZB_ab_2 of the low counter 41 begins with the counter value 70 and ends at the counter value 40. The counter value ranges ZB_auf, ZB_ab represent sporting steps of a driver type or driving behavior wherein as the number of the counter value range ZB_auf and ZB_ab rises the sportiveness of the movement of a vehicle is rated higher. Between two correlating counter value ranges ZB_auf_n and ZB ab_n intersecting zones result in the limit areas due to the offset of the counter value ranges ZB auf and ZB_ab relative each other. The width of the overlapping zone 42 corresponds to the counter value interval by which the counter value ranges have been offset relative each other, that is, the intersecting zone 42 in the example of FIG. 4 has a width of ten counter values. The intersecting zones 42 constitute here passive zones.

If the differentiation operation S4 of FIG. 2 results in that the increment INKR equals zero, that is, the driver-type theoretical value FT_Soll and the driver-type actual value FT_Ist are identical, then in a processing operation S6 the new counter value is determined according to the equation ZW_Neu=ZW_Alt+/−ZW_Null. This means that the counter ZW_Neu has been passed to the range center wherein the sign of the term ZW_Null gives therefrom whether the old counter value ZW_Alt is higher or lower than the range center.

By way of example of this in FIG. 4 is plotted a counter value ZW_Bereichsmitte of the counter value range ZB_auf_1 or ZB_ab_1, the counter value of which amounts to 25.

If the differentiation operation S4 gives the result that the increment is higher or lower than zero, that is, that the driver-type theoretical value FT._Soll and the driver-type actual value FT_Ist differ from each other, in a processing operation S5 an addend is determined from a preceding counter value ZW_Alt and the increment INKR as new counter value ZW_Neu and the counter 39 is set accordingly.

In the second example shown in FIG. 3 the increment amount to 40, that is, the counter value was raised by the amount of 40.

According to the driving situation, the counter 39 thus is increased or decreased directly without filtering or in case of coincidence of the driver-type actual value FT_Ist and driver-type theoretical value FT_Soll, it is set according to the operation to ZW_Neu=ZW_Alt +/−ZW_Null.

In a processing operation S7, with the new counter value ZW_Neu is associated a gear change characteristic line SL from a plurality of gear change characteristic lines each one suited to a certain driver type or cornering style. However, said operation is carried out only when the curve has been driven through, that is, when the vehicle transverse acceleration is less than a limit value (a_Quer<GW).

Thus, a gear change characteristic line corresponding to the driver type is selected with high or low gear change points via the increment INKR.

The return to the main program is effected then via a subsequent processing operation S8.

Reference Numerals 1 automatic transmission
1A mechanical part of the automatic transmission
1B control part of the automatic
2 hydrodynamic converter
3 gear change component
4 gear change component
5 gear change component
6 gear change component
7 gear change component
8 gear change component
9 gear change component
10 hydraulic transmission control device
11 electronic transmission control device
12 input unit
13 input shaft graph
14 impeller
15 turbine wheel
16 stator
17 converter clutch
18 turbine shaft
19 first planetary gear set
20 second planetary gear set
21 third planetary gear set
22 transmission output shaft
23 turbine speed signal line
24 turbine speed measuring device
25 transmission output speed transmission signal line
26 transmission output speed measuring device
27 engine control device
28 micro-controller
29 memory
30 calculation unit
31 control device
32 valve
33 pressure loading arrow
34 wheel speed measuring device
35 performance graph
36 first axis of performance graph
37 second axis of performance
38 third axis of performance graph
39 counter
40 numeric unlimited line high counter
41 numeric unlimited line low counter
42 overlapping zone

What is claimed is:

1. A process for evaluation cornering of a vehicle having an automatic transmission by means of an electronic transmission control device, the electronic transmission control device including a calculation unit, a micro-controller, a memory device and a control device for start-up of a hydraulic transmission control device, the process comprising the steps of:
    a) during a first processing operation (S1), determining a transverse acceleration (a_Quer) of the vehicle by the calculation unit (30) from a wheel speed (n_Rad) of the vehicle measured by a wheel measuring device (34);
    b) determining a driver-type theoretical value (FT_Soll), during a second processing operation (S2), from the vehicle transverse acceleration (a_Quer) and a vehicle speed (V_F); and
    c) determining a gear change characteristic line (SL), based upon an increment (INKR) between the driver-type theoretical value (FT_Soll) and a driver-type actual value (FT_Ist), from several gear change characteristic lines in which each gear change characteristic line (SL) is associated with a certain driver type and cornering style.

2. The process according to claim 1, further comprising the step of determining the vehicle speed (v_F), by the calculation unit (30) during the second processing operation (S2), from a transmission output speed (n_AB) determined by a measured rotational speed of a transmission output shaft (22).

3. The process according to claim 2, further comprising the step of determining the increment (INKR), during a third processing operation (S3), from a preset performance graph (35) which determines a relationship between the driver-type theoretical value (FT_Soll), the driver-type actual value (FT_Ist) and the increment (INKR).

4. The process according to claim 3, wherein the step of determining a gear change characteristic line (SL) further comprises the steps of:
    a) issuing the increment (INKR) to a differentiation operation (S4) to establish whether the increment (INKR) is equal to a value of zero and, in an event that the increment (INKR) is equal to the value of zero, setting a counter (39) to a counter values (ZW) that are subdivided in defined counter value ranges (ZB_auf, ZB_ab) associated with at least one of a certain driver type and a certain cornering style such that, during a sixth processing operation (S6), a new counter value (ZW_Neu) is determined according to the equation ZW_Neu=ZW_Alt±ZW_Null, and, in an event that the increment (INKR) is one of higher and lower than the value of zero, determining an addend as a new counter value (ZW_Neu), during a fifth processing operation (S5), from a preceding counter value (ZW_Alt) and the increment (INKR);
    b) during a seventh processing operation (S7), associating the new counter value (ZW_Neu) with a desired gear change characteristic line (SL); and
    c) returning the process, during an eight processing operation (S8) to a main program.

5. The process according to claim 4, further comprising the step of providing the counter value ranges (ZB_auf, ZB_ab) of the counter (39) with intersecting zones in limit areas of the counter value ranges (ZB_auf, ZB_ab).

6. The process according to claim 2, wherein the step of determining a gear change characteristic line (SL) further comprises the steps of:
    a) issuing the increment (INKR) to a differentiation operation (S4) to establish whether the increment (INKR) is equal to a value of zero and, in an event that the increment (INKR) is equal to the value of zero, setting a counter (39) to a counter values (ZW) that are subdivided in defined counter value ranges (ZB_auf, ZB_ab) associated with at least one of a certain driver type and a certain cornering style such that, during a sixth processing operation (S6), a new counter value (ZW_Neu) is determined according to the equation ZW_Neu=ZW_Alt±ZW_Null, and, in an event that the increment (INKR) is one of higher and lower than the value of zero, determined an addend as a new counter value (ZW_Neu), during a fifth processing operation (S5), from a preceding counter value (ZW_Alt) and the increment (INKR);

b) during a seventh processing operation (S7), associating the new counter value (ZW_Neu) with a desired gear changed characteristic line (SL); and c) returning the process, during an eight processing operation (S8) to a main program.

7. The process according to claim 6, further comprising the step of providing the counter value ranges (ZB_auf, ZB_ab) of the counter (39) with intersecting zones in limit areas of the counter value ranges (ZB_auf, ZB_ab).

8. The process according to claim 1, further comprising the step of determining the increment (INKR), during a third processing operation (S3), from a preset performance graph (35) which determines a relationship between the driver-type theoretical value (FT_Soll), the driver-type actual value (FT_Ist) and the increment (INKR).

9. The process according to claim 8, wherein the step of determining a gear change characteristic line (SL) further comprises the steps of:

a) issuing the increment (INKR) to a differentiation operation (S4) to establish whether the increment (INKR) is equal to a value of zero and, in an event that the increment (INKR) is equal to the value of zero, setting a counter (39) to a counter values (ZW) that are subdivided in defined counter value ranges (ZB_auf, ZB_ab) associated with at least one of a certain driver type and a certain cornering style such that, during a sixth processing operation (S6), a new counter value (ZW_Neu) is determined according to the equation ZW_Neu=ZW_Alt±ZW_Null, and, in an event that the increment (INKR) is one of higher and lower than the value of zero, determining an addend as a new counter value (ZW_Neu), during a fifth processing operation (S5), from a preceding counter value (ZW_Alt) and the increment (INKR);

b) during a seventh processing operation (S7), associating the new counter value (ZW_Neu) with a desired gear change characteristic line (SL); and c) returning the process, during an eight processing operation (S8) to a main program.

10. The process according to claim 9, further comprising the step of providing the counter value ranges (ZB_auf, ZB_ab) of the counter (39) with intersecting zones in limit areas of the counter value ranges of (ZB_auf, ZB_ab).

11. The process according to claim 1, wherein the step of determining a gear change characteristic line (SL) further comprises the steps of:

a) issuing the increment (INKR) to a differentiation operation (S4) to establish whether the increment (INKR) is equal to a value of zero and, in an event that the increment (INKR) is equal to the value of zero, setting a counter (39) to a counter values (ZW) that are subdivided in defined counter value ranges (ZB_auf, ZB_ab) associated with at least one of a certain driver type and a certain cornering style such that, during a sixth processing operation (S6), a new counter value (ZW_Neu) is determined according to the equation ZW_Neu=ZW_Alt±ZW_Null, and, in an event that the increment (INKR) is one of higher and lower than the value of zero, determining an addend as a new counter value (ZW_Neu), during a fifth processing operation (S5), from a preceding counter value (ZW_Alt) and the increment (INKR);

b) during a seventh processing operation (S7), associating the new counter value (ZW_Neu) with a desired gear change characteristic line (SL); and c) returning the process, during an eight processing operation (S8) to a main program.

12. The process according to claim 11, further comprising the step of providing the counter value ranges (ZB_auf, ZB_ab) of the counter (39) with intersecting zones in limit areas of the counter value ranges (ZB_auf, ZB_ab).

* * * * *